United States Patent
Ogata et al.

(10) Patent No.: US 7,357,234 B2
(45) Date of Patent: Apr. 15, 2008

(54) ROLLER TYPE ONE-WAY CLUTCH AND ROLLER FOR THE ROLLER TYPE ONE-WAY CLUTCH

(75) Inventors: Hirofumi Ogata, Fukuroi (JP);
Tomonobu Hasebe, Fukuroi (JP);
Hideharu Ohishi, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 146 days.

(21) Appl. No.: 11/155,692

(22) Filed: Jun. 20, 2005

(65) Prior Publication Data

US 2005/0284720 A1 Dec. 29, 2005

(30) Foreign Application Priority Data

Jun. 21, 2004 (JP) .............................. 2004-182843

(51) Int. Cl.
*F16D 41/066* (2006.01)
*F16D 13/74* (2006.01)

(52) U.S. Cl. ................. 192/45; 192/107 T; 192/113.32

(58) Field of Classification Search .................. 192/45, 192/38, 113.32; 188/82.84; 384/568
See application file for complete search history.

(56) References Cited

U.S. PATENT DOCUMENTS 1,469,991 A * 10/1923 Armstrong .................. 384/568
3,731,774 A * 5/1973 Kitchin ......................... 192/45
3,800,927 A * 4/1974 Takata ......................... 192/45
4,620,621 A * 11/1986 Kulczycki et al. ............ 192/45

FOREIGN PATENT DOCUMENTS

JP 8-338450 12/1996

* cited by examiner

*Primary Examiner*—Rodney H. Bonck
(74) *Attorney, Agent, or Firm*—Miles & Stockbridge P.C.

(57) ABSTRACT

A roller type one-way clutch includes an outer ring and an inner ring disposed concentrically with each other for rotation relative to each other, the outer ring having an axially extending annular inner peripheral cam surface, the inner ring being disposed in the outer ring and having an annular outer peripheral raceway surface, and a plurality of rollers disposed between the outer ring and the inner ring for transmitting torque between the outer peripheral raceway surface and the inner peripheral cam surface. The rolling surface of each of the rollers has a recess depressed toward the axis thereof over the entire circumference thereof. In an alternative arrangement, an axially extending annular inner peripheral raceway surface is provided on the outer ring and an annular outer peripheral cam surface is provided on the inner ring.

4 Claims, 2 Drawing Sheets

ROLLER TYPE ONE-WAY CLUTCH AND ROLLER FOR THE ROLLER TYPE ONE-WAY CLUTCH

BACKGROUND OF THE INVENTION

1. Field of the Invention

This invention relates to a roller type one-way clutch for use as a part of torque transmission, back stop or the like, for example, in the driving apparatus of an automobile, an industrial machine or the like, and more particularly to an improvement in a roller for the roller type one-way clutch.

2. Related Background Art

Generally, a roller type one-way clutch comprises an outer ring, an inner ring disposed concentrically with the outer ring, a plurality of rollers disposed between the outer peripheral surface of the inner ring and the inner peripheral cam surface of the outer ring for transmitting torque, a pad bearing having a U-shaped cross section for effecting the centering of the outer ring and the inner ring and also, guiding the rollers, a spring being in contact with the idle rotation side of the rollers, a mounting plate for the spring, etc.

In such a construction, the one-way clutch is designed such that the inner ring is rotated only in one direction relative to the outer ring by a cam mechanism comprised of a roller and a cam surface. That is, the inner ring is idly rotated in one direction relative to the outer ring, and gives rotational torque to the outer ring only in a direction opposite thereto through the cam mechanism.

A conventional roller will be described here with reference to FIG. 6 of the accompanying drawings. The conventional roller 100 has the shape of a cylindrical runner, and the rolling surface 101 of the roller 100 is of such an even straight shape as shown in Japanese Patent Application Laid-Open No. 8-338450. That is, the roller 100 is in contact with the inner ring or the outer ring over the entire surface thereof in the circumferential direction thereof.

However, when for example, the one-way clutch is used under a very low temperature environment (−20° C. to −40° C.) and the viscosity of ATF in an automatic transmission becomes high, it may happen that the roller type one-way clutch does not normally mesh during meshing engagement from idle rotation, but continuously slips. This leads to the problem that the meshing side of the roller type one-way clutch does not normally function.

For the roller type one-way clutch to mesh, the oil film between the roller and a raceway surface during idle rotation must be sheared and metals must completely contact with each other, but under a very low temperature, there has been the undesirable possibility that the roller continues to slip on the oil (ATF) made high in viscosity. This is because the oil film cannot be cut by the roller.

SUMMARY OF THE INVENTION

It is the object of the present invention to provide a roller type one-way clutch having a high function and high durability in which even under a very low temperature, oil film between a roller and a raceway surface can be effectively sheared and the roller and the raceway surface cam completely contact with each other.

In order to achieve the above object, the roller type one-way clutch of the present invention is a roller type one-way clutch comprising an outer ring and an inner ring radially spaced apart from each other and disposed concentrically with each other for rotation relative to each other, the outer ring having an axially extending annular inner peripheral cam surface, the inner ring being disposed in the outer ring and having an annular outer peripheral raceway surface, and a plurality of rollers disposed between the outer ring and the inner ring for transmitting torque between the outer peripheral raceway surface and the inner peripheral cam surface, wherein the rolling surface of each of the rollers has a recess depressed toward the axis thereof over the entire circumference thereof.

Also, the roller type one-way clutch of the present invention is a roller type one-way clutch comprising an outer ring and an inner ring radially spaced apart from each other and disposed concentrically with each other for rotation relative to each other, the outer ring having an axially extending annular inner peripheral raceway surface, the inner ring being disposed in the outer ring and having an annular outer peripheral cam surface, and a plurality of rollers disposed between the outer ring and the inner ring for transmitting torque between the inner peripheral raceway surface and the outer peripheral cam surface, wherein the rolling surface of each of the rollers has a recess depressed toward the axis thereof over the entire circumference thereof.

Further, the roller of the present invention is a roller for use as the torque transmitting member of a one-way clutch, wherein the rolling surface of the roller has a recess depressed toward the axis thereof over the entire circumference thereof.

According to the present invention, there are obtained the following effects. Since the rolling surface of the roller has a recess depressed toward the axis thereof over the entire circumference thereof, it becomes easy for oil film at the moment of meshing (the beginning of meshing) from idle rotation to be shearing to thereby cause metals to contact with each other. Or an opportunity for the metals to contact with each other can be caused to thereby greatly improve meshing performance under a low-temperature environment. In addition, if the load of a spring urging the roller in a meshing direction is increased, the effect will be further increased.

The present invention can obtain particularly an improvement in a low-temperature meshing limit temperature and can therefore provide a one-way clutch which is reliable in meshing and good in performance even in an area of a lower temperature.

By the amount of depression of the recess of the roller being made equal to or greater than the thickness of the oil film and made equal to or less than elastic deformation at maximum torque used, performance and durability can be made compatible with each other.

DESCRIPTION OF THE PREFERRED EMBODIMENTS

Figure 1:
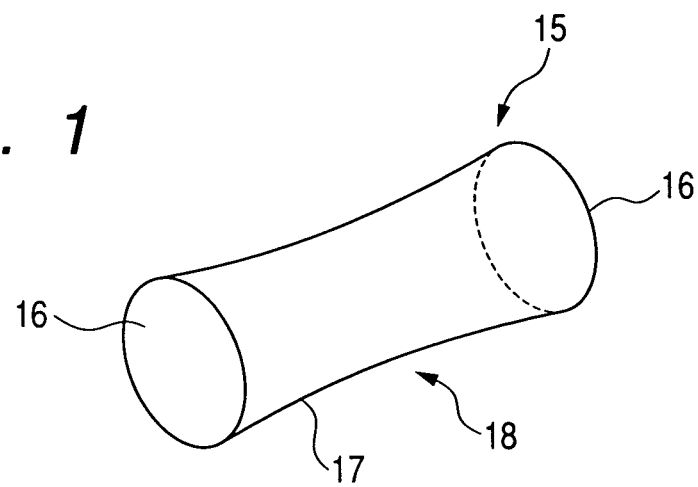
FIG. 1 is a perspective view of a roller used in the roller type one-way clutch of the present invention.

The present invention will hereinafter be described in detail with reference to the drawings. The embodiments hereinafter described are illustrative of the present invention and of course, do not restrict the present invention thereto. Also, throughout the drawings, like portions are represented by like reference characters.

Figure 2:
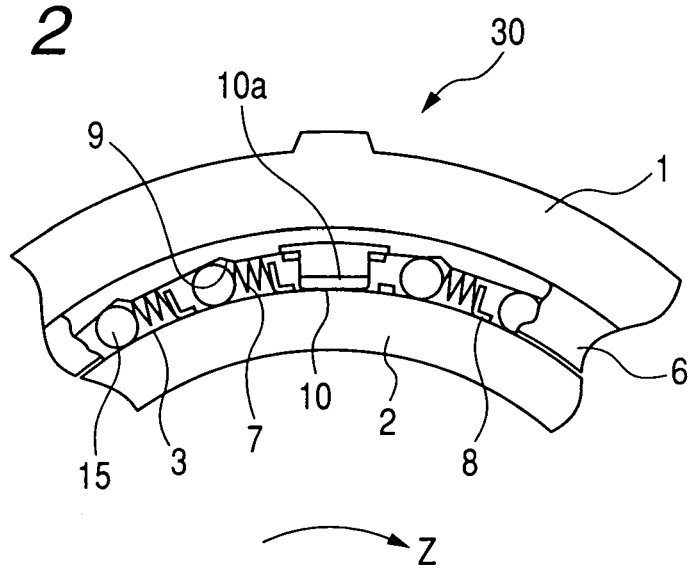
FIG. 2 is a partly broken-away front view of a roller type one-way clutch according to an embodiment of the present invention.

FIG. 2 is a partly broken-away front view showing an inner peripheral cam roller type one-way clutch 30 according to an embodiment of the present invention. In the ensuring description, for the simplification of description, the "roller type one-way clutch" will be simply referred to as the "one-way clutch".

The one-way clutch 30 comprises an outer ring 1, an inner ring 2 disposed concentrically with the outer ring 1, a plurality of roller members, i.e., rollers 15 disposed between the outer peripheral raceway surface 3 of the inner ring 2 and the inner peripheral cam surface 9 of the outer ring 1, a pad rod 10 for effecting the centering of the outer ring 1 and the inner ring 2 and also, guiding the rollers 15, a spring 7 contacting with the idle rotation side of the rollers 15, and a mounting plate 8 for the spring 7. The rollers 15 are prevented from axially falling off by a side plate 6.

In such a construction, the one-way clutch 30 is designed such that the inner ring 2 is rotated only in one direction relative to the outer ring 1 by a cam mechanism comprised of the rollers 15 and an inner peripheral cam surface 9. That is, the inner ring 2 is idly rotated in the direction of arrow Z in FIG. 2 relative to the outer ring 1, and gives rotational torque to the outer ring 1 only in a direction opposite thereto through the cam mechanism. The pad bearing 10 guides the rollers 15 and also, effects the centering of the inner ring 2 relative to the outer ring 1. In the present embodiment, the outer ring 1 is provided with the inner peripheral cam surface so that the rollers 15 may roll between it and the outer peripheral raceway surface of the inner ring 2, but of course, the cam also be adopted a construction in which the outer ring 1 is provided with an inner peripheral raceway surface and the inner ring 2 is provided with an outer peripheral cam surface.

FIG. 1 is a perspective view of the roller 15 used in the one-way clutch 30 of the present invention. The roller 15 is a substantially cylindrical metallic member having a rolling surface 17 formed with a recess 18 depressed in the axially direction thereof from the opposite end surfaces thereof over the entire circumference thereof. Although difficult to understand in FIG. 1, the boundary portions between end surfaces 16 and rolling surface 17 of the roller 15 are formed as curved surfaces as in FIGS. 3 to 5 which will be described later.

Figure 3:
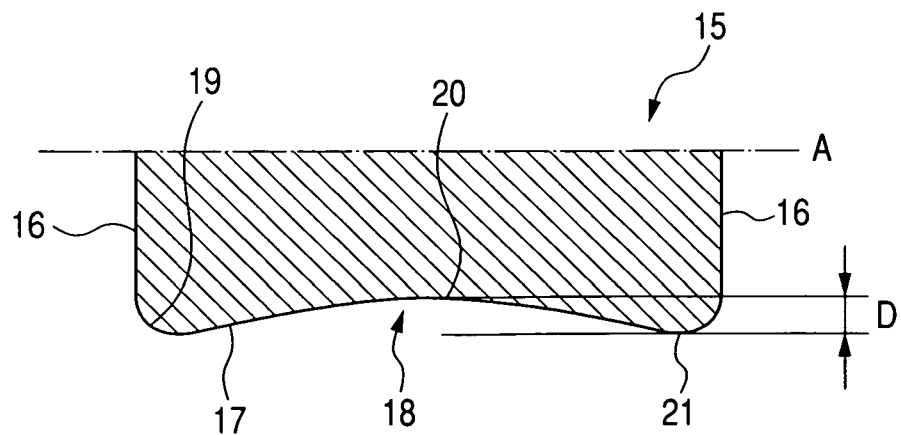
FIG. 3 is an axial fragmentary cross-sectional view of a roller showing an example of the recess of the roller.
Figure 4:
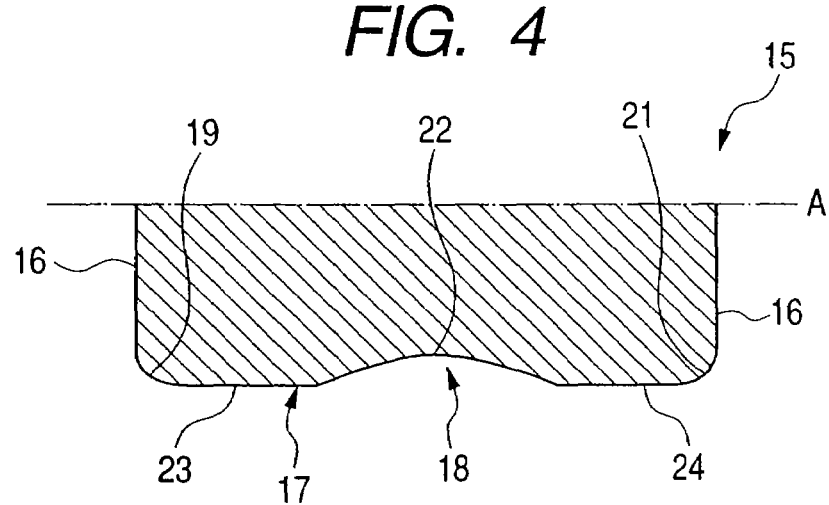
FIG. 4 is an axial fragmentary cross-sectional view of a roller showing another example of the recess of the roller.
Figure 5:
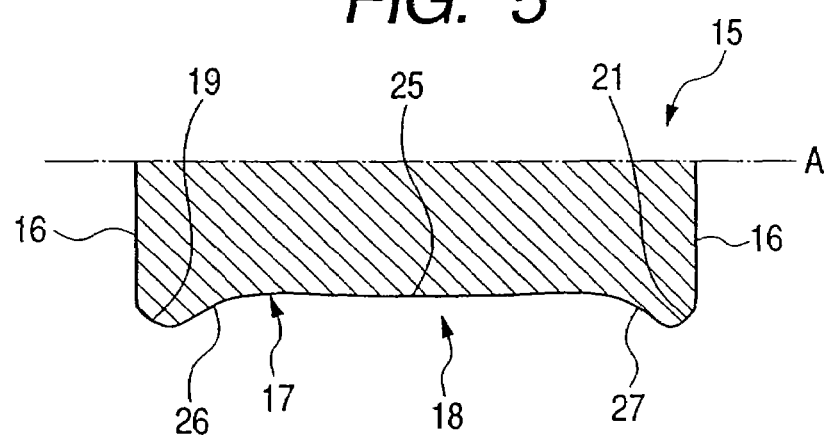
FIG. 5 is an axial fragmentary cross-sectional view of a roller showing still another example of the recess of the roller.
Figure 6:
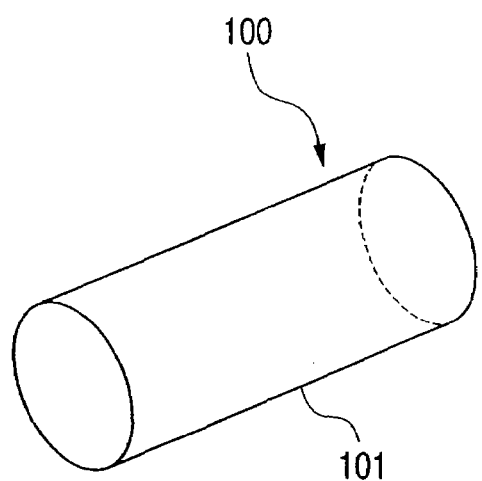
FIG. 6 is a perspective view of the roller of a conventional roller type one-way clutch.

FIGS. 3 to 5 are axial fragmentary cross-sectional views of the roller 15 showing examples of the recess of the roller 15 according to the present invention. FIG. 3 shows an example of the roller 15, and the rolling surface 17 between the axial opposite ends 16 is formed with a recess 18 depressed toward an axis A over the entire circumference thereof. The recess 18 is formed between corners 19 and 21 formed on the axial opposite ends of the roller 15. The corners 19 and 21 are formed as curved surfaces having a predetermined curvature.

The recess 18 is formed as a gently curved surface i.e., arcuate portion 20, continuous from the corner 19 and the corner 21. It is preferable that the distance D between the vertex of the arcuate portion 20 and the corner 19 and between the vertex and the corer 21 be set to 0.002-0.015 mm at maximum. The depth of the recess 18 is very slight, but in FIGS. 3 to 5, it is exaggeratedly shown for the convenience of illustration.

In the space between the recess 18 and the raceway surface of the inner ring 2, oil film at the moment of meshing (the beginning of meshing engagement) from idle rotation is sheared and it becomes easy for metals to contact with each other. Also, thereby, an opportunity for the metals to contact with each other can be caused. Accordingly, low-temperature meshing performance is greatly improved. Also, the load of the spring 7 which biases the roller 15 in the meshing direction is increased, whereby the effect is further increased.

Another example will now be described with reference to FIG. 4. In this example, the rolling surface 17 comprises straight portions 23 and 24 extending from the corner 19 and the corner 21, respectively, and the curved portion, i.e., arcuate portion 22 between the straight portions 23 and 24, and the arcuate portion 22 forms the recess 18. The straight portions 23 and 24 and the arcuate portion 22 are formed over the entire circumference of the rolling surface, and the arcuate portion 22 is depressed toward the axis A.

In the example shown in FIG. 5, the rolling surface 17 comprises curved portions 26 and 27 extending from the corner 19 and the corner 21, respectively, and a straight portion 25, and the curved portions 26 and 27 and the straight portion 25 together form the recess 18. The curved portions 26 and 27 and the straight portion 25 are formed over the entire circumference of the rolling surface, and the straight portion 25 is depressed toward the axis A.

Again in the examples shown in FIGS. 4 and 5, it is preferable that the distance between the vertex of the arcuate portion 22 and the straight portion 23 between and the vertex and the straight portion 24 and the maximum distance between the straight portion 25 and the corner 19 between the straight portion 25 and 17 and the corner 21 be set to the ranges described in connection with FIG. 3.

The following can be said to be common to the respective examples of the recess 18 of the rolling surface 17 described above. Usually, during the meshing state to a maximum load, torque inputting, the maximum value of the amount of depression is set within a range suppressing localized surface pressure rise by the amount of elastic deformation of the roller (in calculation, about 0.015-0.030 mm). The amount of depression of the recess 18 can be made equal to or greater than the thickness of the oil film and equal to or less than the elastic deformation to thereby make performance and durability compatible with each other. However, although it is preferable to set the aforementioned amount of depression so as to be within this range, this is not restrictive if the amount of depression is within a range in which predetermined performance and durability can be obtained.

While in the above-described embodiments, the arcuate portion and each straight portion are continuously provided, they can also be continuously provided. Also, a plurality of arcuate portions forming the recess can also be provided between the opposite end surfaces 16. The present invention is greater in effect under a use environment of low temperature, as compared with the prior art, but of course, a remarkable effect can also be obtained under an ordinary use environment.

The roller of the present invention can be utilized in other clutches than the one-way clutch.

This application claims priority from Japanese Patent Application No. 2004-182843 filed on Jun. 21, 2004, which is hereby incorporated by reference herein.

What is claimed is:

1. A roller type one-way clutch comprising an outer ring and an inner ring radially spaced apart from each other and disposed concentrically with each other for relative rotation, one of said outer ring and said inner ring having an axially extending annular peripheral raceway surface, the other of said outer ring and said inner ring having an annular peripheral cam surface, a plurality of rollers being disposed between said outer ring and said inner ring for transmitting torque between said peripheral raceway surface and said peripheral cam surface, wherein a rolling surface of each said roller has a recess depressed toward the axis thereof over the entire circumference thereof, and wherein said recess has a maximum depth greater than or equal to a thickness of an oil film between said roller and said peripheral raceway surface, and less than or equal to an elastic deformation of said roller at maximum torque.

2. A roller type one-way clutch according to claim 1, wherein said recess is formed by a curved portion.

3. A roller type one-way clutch according to claim 1, wherein said recess is formed by a combination of a curved portion and a straight portion.

4. A roller type one-way clutch according to claim 1, wherein said recess has a maximum depth of 0.002-0.015 mm.

* * * * *